Figure 1:
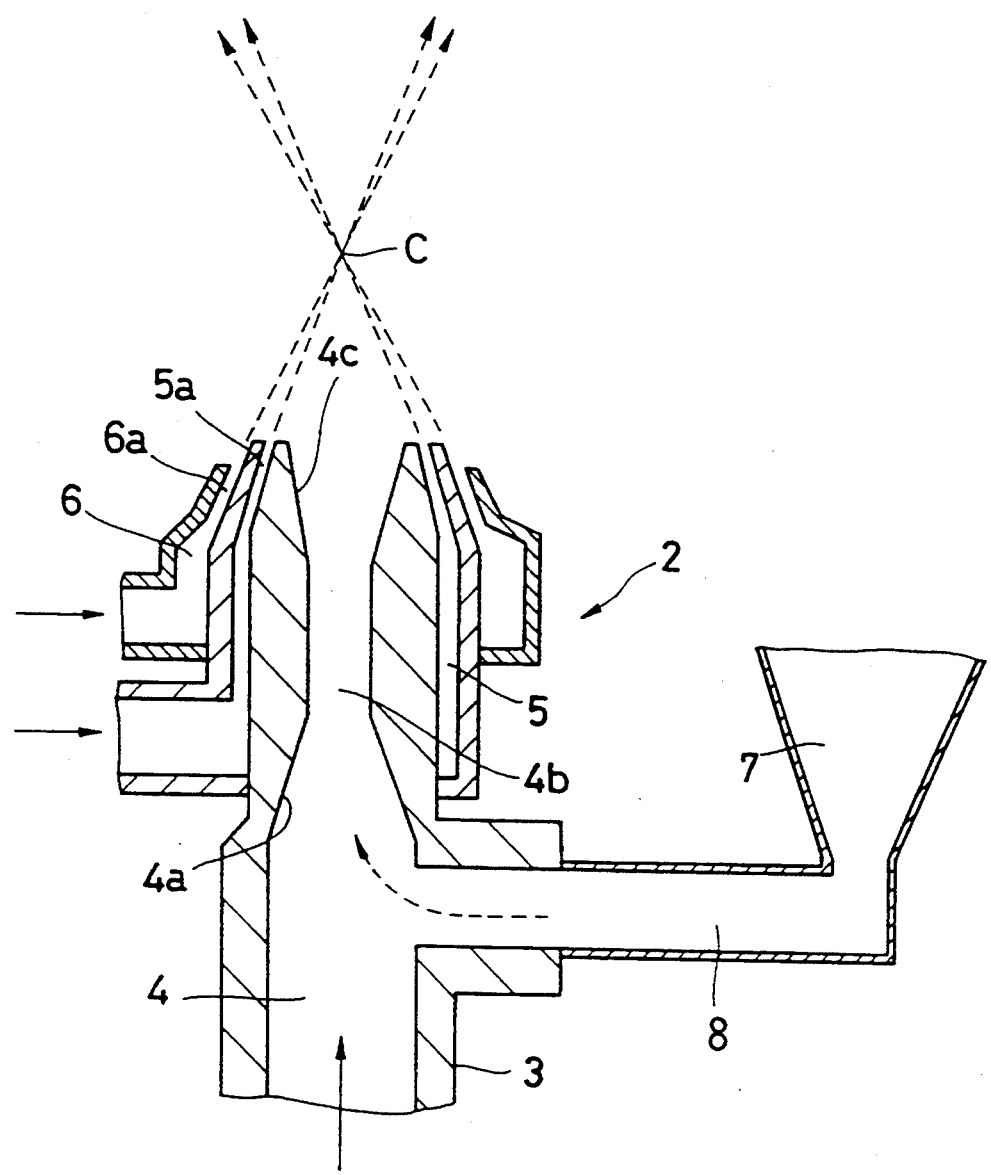

United States Patent
Tanaka et al.

[11] Patent Number: 5,447,567
[45] Date of Patent: Sep. 5, 1995

[54] APPARATUS FOR COATING POWDERY MATERIAL

[75] Inventors: Nagahiko Tanaka; Narimichi Takei; Kaoru Kurita, all of Tokyo, Japan

[73] Assignee: Freund Industrial Co., Ltd., Tokyo, Japan

[21] Appl. No.: 75,552

[22] PCT Filed: Oct. 16, 1992

[86] PCT No.: PCT/JP92/01355

§ 371 Date: Jun. 15, 1993

§ 102(e) Date: Jun. 15, 1993

[87] PCT Pub. No.: WO93/07962

PCT Pub. Date: Apr. 29, 1993

[30] Foreign Application Priority Data

Oct. 18, 1991 [JP] Japan .................. 3-270598

[51] Int. Cl.$^6$ ............ B05B 7/06; B05B 7/14; B05C 5/00

[52] U.S. Cl. ................. 118/303; 118/315; 118/326; 239/424; 239/336

[58] Field of Search ......... 118/303, 315, 300, 326; 239/424, 336; 241/39, 41, 57

[56] References Cited

U.S. PATENT DOCUMENTS

| 2,929,436 | 3/1960 | Hampshire | 118/303 |
|---|---|---|---|
| 3,009,826 | 11/1961 | Straughn et al. | 239/424 |
| 3,073,534 | 1/1963 | Hampshire | 239/424 |
| 3,110,626 | 11/1963 | Larson et al. | 118/303 |
| 3,126,157 | 3/1964 | Dickerson | 239/424 |
| 3,185,396 | 5/1965 | Black | 239/424 |
| 3,232,540 | 2/1966 | Cassanmagnago | 239/424 |
| 3,251,550 | 5/1966 | Lippert et al. | 239/424 |
| 3,484,044 | 12/1969 | Dombruch et al. | 239/424 |
| 3,499,476 | 3/1970 | Hartlapp et al. | |
| 4,263,346 | 4/1981 | Sandell | 239/424 |
| 4,946,654 | 8/1990 | Unlemann et al. | 118/303 |
| 4,960,244 | 10/1990 | Maag et al. | 118/303 |
| 5,075,138 | 12/1991 | Tanaka et al. | 118/303 |
| 5,096,744 | 3/1992 | Takei et al. | 118/303 |

FOREIGN PATENT DOCUMENTS

47-13762  4/1972  Japan .
2-90957   3/1990  Japan .

Primary Examiner—W. Gary Jones
Assistant Examiner—Steven P. Griffin
Attorney, Agent, or Firm—Kane, Dalsimer, Sullivan, Kurucz, Levy, Eisele and Richard

[57] ABSTRACT

A coating apparatus using jet air streams, wherein a spray nozzle (2) of the coating apparatus includes: a powder blow-out path (4) provided in an axially central portion of the main body (3) of the nozzle; a coating liquid blow-out path (5) annularly formed on the outer periphery of the powder blow-out path (4); and a compressed air blow-out path (6) having a taper-shaped outlet portion and annularly formed on the outer periphery of the coating liquid blow-out path (5).

7 Claims, 4 Drawing Sheets

APPARATUS FOR COATING POWDERY MATERIAL

TECHNICAL FIELD

This invention relates to a granulating and coating technique, and more particularly to a technique effective for use in granulating, coating and drying of powdery material of which each particle has a comparatively minute diameter.

BACKGROUND ART

In general, among the granulating and coating techniques for powdery material, such a type of technique is known that respective spray nozzles for supplying powdery material as articles to be coated and for supplying a coating liquid as coating material are disposed to be opposed to each other in a diametral direction of a vertical coating cylinder and dry air stream such as hot air is supplied from thereunder.

Furthermore, there is also known another type where two spray nozzles are provided in erected postures and generally in parallel to each other.

However, according to the spray nozzle technique of the above-described opposedly disposed type, it is difficult to maintain equal blow-out force between these spray nozzles, when the articles to be coated and the coating material should collide with each other from opposite directions.

When, for example, the blow-out force of the coating liquid is stronger, such disadvantages occurs that the coating material adheres to an opposed inner wall surface of the coating apparatus to be solidified thereon, or, before solidifying of the coating material, the articles to be coated adhere onto the coating material on the wall to be agglomerated there.

Furthermore, due to the unbalance in the blow-out forces or in the blown-out rate, there may be disadvantage that the coating liquid becomes particles by itself through the so-called spray dry phenomenon without adhering to and forming coat on the articles to be coated.

Furthermore, according to the above-described technique of parallelly disposed spray nozzles, the powdery material and the coating liquid are supplied from the substantially same direction, so that the efficiency of contact therebetween may be in low level.

It is an object of the present invention to provide a technique wherein the probabilities of contact between the powdery material and the coating liquid is raised so that coating is performed efficiently.

It is another object of the present invention to provide a technique wherein reliable coating can be performed by use of one spray nozzle.

DISCLOSURE OF THE INVENTION

Out of inventions disclosed here, typical one will be outlined briefly hereunder.

That is, a coating apparatus according to the present invention is an apparatus wherein powdery material is coated by jet air stream blown out of a spray nozzle, and the spray nozzle comprises:

- a powder blow-out path, through which the powdery material is blown out by an air stream from the axially central portion of a main body of the nozzle;
- a coating liquid blow-out path having an annular shape in cross-section, for blowing out the coating liquid from the outer periphery of the powder blow-out path; and
- a compressed air blow-out path having an annular shape in cross-section and being tapered at least in the outlet portion thereof, for blowing out compressed air from the outer periphery of the coating liquid blow-out path.

A powder supply path coming out of a supply source of the powdery material may be communicated with the intermediate portion of the powder blow-out path which is formed in the axially central portion of the main body of the spray nozzle.

Further, the coating liquid blow-out path may be formed to have a tapered shape at least at the outlet portion thereof.

The outlet portion of the powder blow-out path may be constructed to have a reversely tapered shape toward the outlet, its cross-section being of a circular shape.

In the coating apparatus, the spray nozzle may be directed upwardly or downwardly in the axial direction in a coating chamber which is formed as a vertical tubular member.

In the above-described coating apparatus according to the present invention, the coating liquid blown out of the coating liquid blow-out path is atomized by the compressed air blown out of the compressed air blow-out path disposed on the outer periphery of the coating liquid blow-out path, converges once, and thereafter, is diffused, so that the probability of contact between the droplets of the coating liquid and the powdery material becomes high level, thus enabling to perform efficient coating.

BRIEF DESCRIPTION OF DRAWINGS

FIG. 1 is an enlarged partially sectional view showing one embodiment of the spray nozzle used in the coating apparatus according to the present invention;

FIG. 2 is a schematic explanatory view showing one embodiment of the coating apparatus according to the present invention;

FIG. 3 is a schematic enlarged horizontal sectional view showing a coating chamber thereof; and FIG. 4 is a schematic explanatory view showing the essential portion of another embodiment of the coating apparatus according to the present invention.

Embodiment 1

FIG. 1 is an enlarged partially sectional view showing an embodiment of the spray nozzle used in a coating apparatus according to the present invention; FIG. 2 is a schematic explanatory view showing an embodiment of a coating apparatus according to the present invention; and FIG. 3 is a schematic enlarged horizontal sectional view showing a coating chamber thereof.

In the coating apparatus of this Embodiment 1, the vertical processing tube, i.e., a coating chamber 1, as being a main element of the apparatus, for performing granulating, coating, drying and the like of powdery material by jet streams in its interior, has a cylindrical shape of stepped construction having horizontal cross-section as shown in FIG. 3 for example, with a lower portion of a smaller diameter and an upper portion of a larger diameter.

On the bottom wall of the coating chamber 1, there is provided a spray nozzle 2 in the axial and upward direction of the interior of the coating chamber 1, for supplying both of the powdery material and the coating liquid.

As shown in FIG. 1, this spray nozzle 2 has a triple nozzle construction. That is, the spray nozzle 2 comprises: a powder blow-out path 4 formed in the axially central portion of a main body 3 of the spray nozzle 2; a coating liquid blow-out path 5 formed to provide an annular shape in cross-section on the outer periphery of the powder blow-out path 4; and a compressed air blow-out path 6 formed to provide an annular shape in cross-section on the outer periphery of the coating liquid blow-out path 5.

The powder blow-out path 4 has a circular shape in cross-section and includes a tapered portion 4a and a uniform (i.e. non-tapering) straight-lined throat portion 4b near the forward end portion thereof, and a reversely tapered portion 4c at the outlet portion thereof.

A powder supply path 8 for supplying the powdery material out of a powder supply source 7 is communicated with the intermediate portion of the powder blow-out path 4 in the crossing direction. With this arrangement, the powdery material in the powder supply source 7 is sucked by the compressed air stream from a compressed air source 9 (Refer to FIG. 2) through the powder supply path 8, dispersed into the compressed air stream and accompanyingly blown out.

On the other hand, the coating liquid blow-out path 5 has a tapered portion 5a as its outlet portion, through which the coating liquid from a coating liquid source 10 is blown out, by use of a pump not shown, in an annular and tapered shape at the outside of the blow-out stream of the powdery material.

Further, the compressed air blow-out path 6 is positioned at the outermost peripheral portion of the spray nozzle 2 and has a tapered portion 6a as its outlet portion, through which the compressed air from a compressed air source 11 is blown out in an annular and tapered shape.

Accordingly, a compressed air stream from the compressed air blow-out path 6 can atomize the coating liquid from the coating liquid blow-out path 5, and moreover, as shown in FIG. 1, converges once at a converging point C and then is diffused. Thus, the droplets of the coating liquid from the coating liquid blow-out path 5 and the powdery material from the powder blow-out path 4 can reliably come into contact with each other particularly at the above-described converging point C, thereby attaining very high probability of contact therebetween.

Furthermore, an annular cold air supply opening (cold air supply means) 12 is provided in the bottom wall of the coating chamber 1 on the outer peripheral side of the spray nozzle 2. This cold air supply opening 12 is formed of a screen member or porous member for example, and, as the porous member, a porous metal plate, a plate of sintered material and the like may be used. The cold air brought into the coating chamber 1 through this cold air supply opening 12 is introduced to a region where the powdery material and the coating liquid from the spray nozzle 2 collide with each other.

On the other hand, an annular hot air supply opening (hot air supply means) 13 is formed in a stepped portion between the small diameter portion and the large diameter portion of the coating chamber 1. The diameter of the annular shape of this hot air supply opening 13 is larger than the diameter of the annular shape of the cold air supply opening 12. Furthermore, the hot air supply opening 13 is disposed at a position spaced more apart from the spray nozzle 2 than the cold air supply opening 12. Accordingly, the hot air through the hot air supply opening 13 is supplied to a region which is more distant from the spray nozzle 2 than the region where the powdery material and the coating liquid from the spray nozzle 2 collide with each other, and the cold air from the cold air supply opening 12 is introduced.

Further, a collecting path 14 is opened at the top of the coating chamber 1, and coated products 15, on which processing such as granulating, coating, drying and the like have completed in the coating chamber 1, are sucked from the interior of the coating chamber i to its exterior by means of a blower 16 or the like.

That is, it is constructed so that the coated products 15 which have been sucked to the outside of the coating chamber 1 through the collecting path 14 descend in a cyclone 17, pass through a rotary valve 18 and are collected into a recovery container 19, while very small powders and dust, which cannot be used as the intended products, are collected and removed into a bag filter 20, without descending in the cyclone 17.

Operation of this embodiment will be described hereunder.

The powder material to be treated and the coating liquid are blown out from the powder blow-out path 4 and the coating liquid blow-out path 5 of the spray nozzle 2 respectively, into the coating chamber 1 together with the compressed air from the compressed air blow-out path 6. At this time, blow-out forces from the respective blow-out paths 4, 5 and 6 are controlled independently through the respective adjustments of pneumatic pressures of the compressed air sources 9 and 11, and blow-out pressure of the coating liquid.

Then, at this time of blow-out, the coating liquid from the coating liquid blow-out path 5 is atomized by the compressed air stream from the compressed air blow-out path 6 disposed on the outer periphery of the coating liquid blow-out path 5, being accompanied by the compressed air stream. Moreover, the compressed air stream is blown out in an annular and tapered shape by the tapered portion 6a, converges once, and then diffuses.

Accordingly, the powdery material from the powder blow-out path 4 passes through a flow course of the coating liquid from the coating liquid blow-out path 5, particularly at the converging point C, whereby both the powdery material and the coating liquid are reliably brought into contact with each other, so that the coating liquid is coated around the surface of the powdery material uniformly, thus enabling to perform granulating and coating reliably and efficiently.

In that operation, the coating liquid and the powdery material are not blown out In directions opposite to each other, so that it is suppressed that the coating liquid and the powdery material adhere to the inner wall surface of the coating chamber 1 even if there is some unbalance in the blow-out forces of the coating liquid and the powdery material. Furthermore, agglomerating and solidifying of the coating liquid itself, i.e., the so-called spray dry phenomenon is suppressed.

It is to be noted that the cold air from the cold air supply opening 12 is supplied to the region where the powdery material and the coating liquid from the spray nozzle 2 collide with each other, so that the coating liquid and the powdery material can be prevented from adhering to the inner wall surface of the coating chamber 1. In addition, the cold air, not hot air, is supplied to the colliding region, so that it can be prevented that the spray dry phenomenon, in which the coating liquid is evaporated and solidified before colliding with the powdery material, never occurs.

On the other hand, the hot air is supplied through the hot air supply opening 13 to a portion above the colliding region to which the cold air is supplied, of the coating chamber 1, so that the coating liquid coated on the powdery material can be efficiently dried by this hot air. Furthermore, because of this hot air also, the powdery material can be prevented from adhering to the inner wall surface of the coating chamber 1.

By the above-described cold air and hot air, mainly by the hot air from the hot air supply opening 13, the articles to be coated, i.e., the powdery material, which has been coated with the coating liquid, is dried to desirable extent.

Particularly, in this embodiment, supplying the cold air to the colliding region and supplying the hot air to the region upwardly thereof, the efficient and reliable coating can be performed without the spray dry phenomenon and adhering to the wall surface.

The coated products 15 are sucked by means of the blower 16 from the coating chamber 1 through the collecting path 14 to the cyclone 17.

In the cyclone 17, the coated products 15 descend in the cyclone 17, pass through the rotary valve 18 and are collected into the recovery container 19.

On the other hand, the very small powders and dust which have been sucked into the cyclone 17 are sucked toward the bag filter 20 through the sucking force of the blower 16 from the top of the cyclone 17, collected into the bag filter 20 and removed to the outside of the system.

Figure 2:
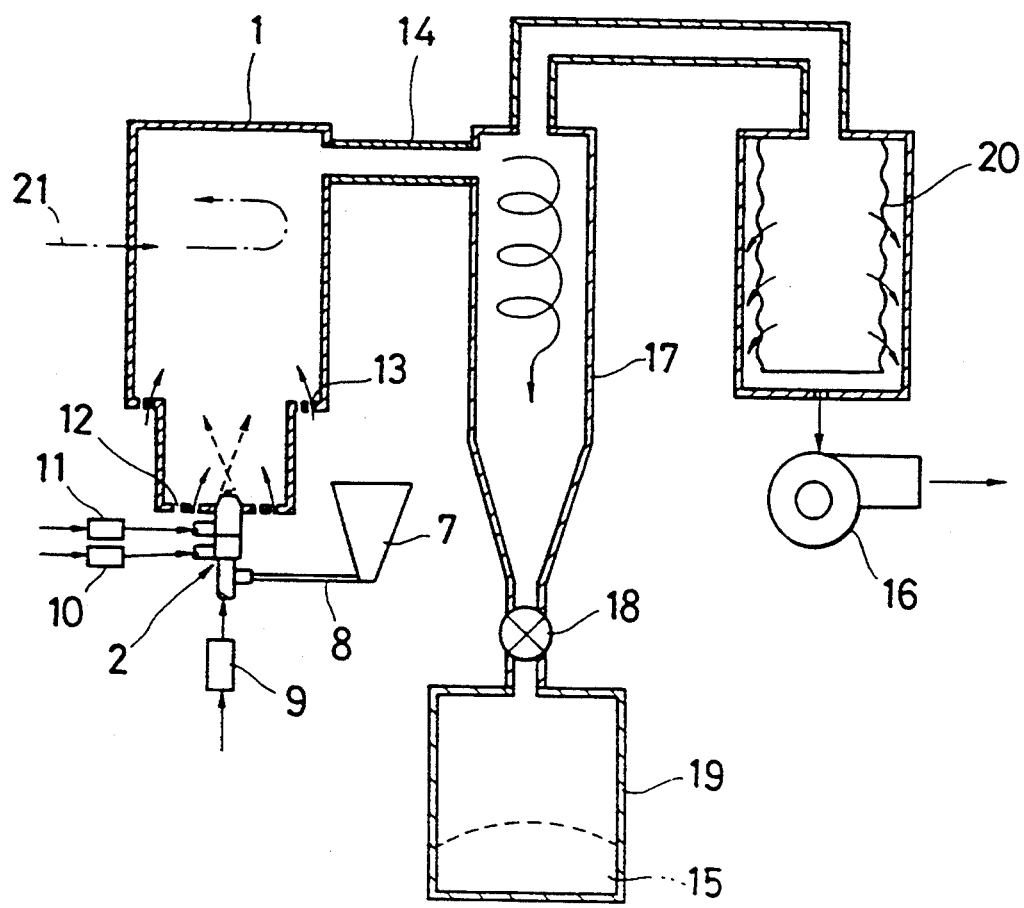
Figure 3:
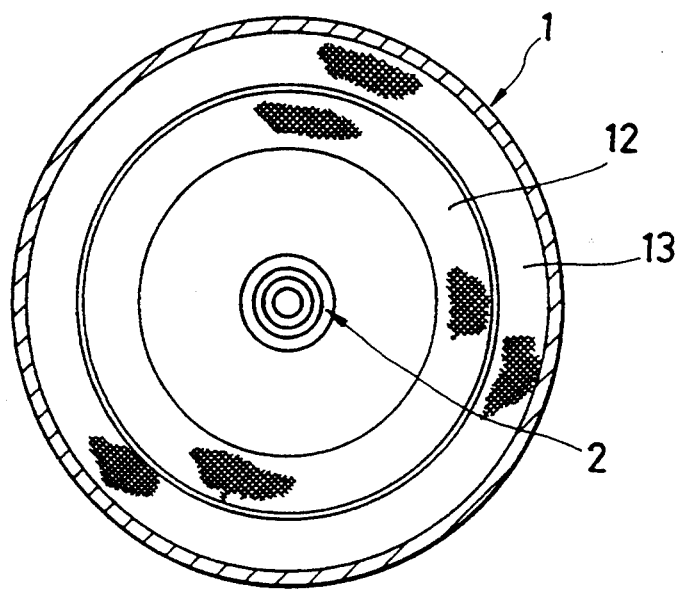

Incidentally, in this embodiment, as indicated by a two-dot chain line In FIG. 2, a hot air inlet opening 21 as being another hot air supply means for supplying hot air from a tangential direction of the coating chamber 1 may be provided in the substantially intermediate portion of the large diameter portion of the coating chamber 1.

In this construction, the hot air from the hot air inlet opening 21 is introduced in the tangential direction, so that the time of contact between the coated products and the hot air becomes longer. Furthermore, a substantially spiral air stream is produced, so that the coating liquid and the powdery material can be effectively prevented from adhering to the inner wall surface of the coating chamber 1.

Embodiment 2

Figure 4:
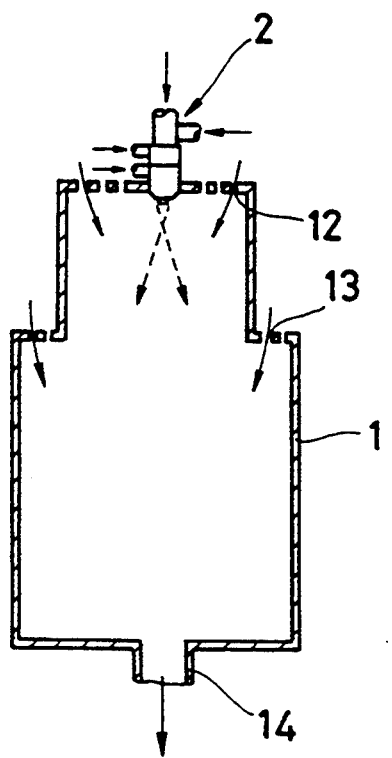

FIG. 4 is a schematic explanatory view showing an essential portion of another embodiment of the granulating and coating apparatus according to the present invention.

In this Embodiment 2, the spray nozzle 2 and the cold air supply opening 12 are provided on the top ceiling wall of the coating chamber 1, being directed downwardly in the axial direction, but not on the bottom wall. Further, the hot air supply opening 13 is disposed at a position below the cold air supply opening 12.

Furthermore, in this Embodiment 2, in accordance with the spray nozzle 2 directed downwardly, the collecting path 14 is provided on the bottom of the coating chamber 1.

In this construction of Embodiment 2, the spray nozzle 2, the cold air supply opening 12, the hot air supply opening 13 and the collecting path 14 are provided in a direction reverse to Embodiment 1. However, the coating, drying, collecting and the like of the powdery material, the coating liquid and the coated powdery material are performed in the same order, so that such functional effects as the prevention of the coating liquid from adhering to the inner wall surface of the coating chamber 1 and from being agglomerated can be achieved similarly to Embodiment 1.

The invention made by the present inventors has been described above in detail with reference to the embodiments. However, the present invention should not be limited to the above embodiments, and many variants can be made within the scope of the invention.

For example, the installing positions and directions of the spray nozzle 2, the cold air supply opening 12, the hot air supply opening 13 and the collecting path 14 may be those other than that in the above embodiments.

The constructions of the cold air supply opening 12 and the hot air supply opening 13 may be those other than the annular porous one.

Furthermore, the number of the hot air inlet opening 21 may be one or plural.

Further, the sectional shape of the coating chamber 1 is not limited to the above embodiments.

In the above description, the invention made by the present inventors may be applied to the fields of utilization including granulating, coating and drying of pharmaceuticals, foods, cosmetics and chemicals, however, the invention is not limited to these, and is applicable to granulating, coating, drying and the like of, for example, other powdery materials.

The following is the brief description of the effects obtained by the typical one out of the inventions disclosed in the present application.

That is, the coating liquid blown out of the coating liquid blow-out path is atomized by the compressed air blown out of the compressed air blow-out path disposed on the outer periphery thereof, and moreover, the coating liquid converges once after blow-out and is diffused, whereby the powdery material passes the flow course of the coating liquid at the converging point without fall, so that both the powdery material and the coating liquid are reliably brought into contact with each other, thereby attaining high probabilities of contact therebetween.

Accordingly, in the present invention, the efficient coating can be reliably performed with only one spray nozzle.

We claim:

1. A coating apparatus for performing coating on a powdery material by jet streams blown out of a spray nozzle axially disposed in a vertically extending tubular coating chamber, said spray nozzle comprising:
    a main body;
    a central opening extending axially through said main body defining a powder blow-out path, said powder blow-out path including a reverse taper portion extending toward an outlet portion of said spray nozzle;
    a powder supply source communicating with an intermediate section of said powder blow-out path;
    a coating liquid blow-out path annularly disposed about said main body and tapering toward and extending to said outlet portion of said spray nozzle so that coating liquid flowing through said coating liquid blow-out path converges at a point beyond said outlet portion of said spray nozzle; and
    a compressed air blow-out path annularly disposed about said coating liquid blow-out path tapering toward and extending to said outlet portion of said spray nozzle so that compressed air flowing through said compressed air blow-out path converges at said converge point;

wherein said powder blow-out path passes through said coating liquid converge point whereby powder passing through said powder blow-out path collides with coating liquid at said converge point.

2. The coating apparatus in accordance with claim 1 wherein said central opening includes a tapering portion extending from said intermediate section of said powder blow-out path toward said reverse taper portion and a uniform straight-lined throat portion interposed between said tapered portion and said reverse tapered portion.

3. The coating apparatus in accordance with claim 1 wherein said spray nozzle is directed upwardly into said coating chamber.

4. The coating apparatus in accordance with claim 1 wherein said spray nozzle is directed downwardly into said coating chamber.

5. The coating apparatus in accordance with claim 1 wherein said coating chamber includes a small diameter lower portion, a large diameter upper portion, a step portion connecting said lower and upper portions and said spray nozzle extends upwardly into said coating chamber from a bottom wall surface thereof and further comprising:

a cold air supply opening in said bottom wall surface disposed about said spray nozzle;

a hot air supply opening disposed in said step portion, wherein said step portion is disposed above the converge point so that cold air is supplied to a region of said coating chamber including said converge point where said coating liquid and powdery material collide and hot air is supplied to a region of said chamber downstream of where said coating liquid and powdery material collide.

6. The coating apparatus in accordance with claim 1 further comprising:

a bag filter communicating with a top portion of said coating chamber, said bag filter collecting very small particles and dust; and a blower connected to said bag filter for drawing said very small particles and dust into said bag filter.

7. The coating apparatus in accordance with claim 1 further comprising:

a cyclone communicating with a top portion of said coating chamber, said cyclone including a container for collecting coated products;

a bag filter communicating with a top portion of said cyclone, said bag filter collecting very small particles and dust; and a blower connected to said bag filter for drawing said very small particles and dust into said bag filter.

* * * * *